US012658343B2

(12) United States Patent
Liang et al.

(10) Patent No.: US 12,658,343 B2
(45) Date of Patent: Jun. 16, 2026

(54) SIGNAL CONTROL USING TEMPERATURE AND RESISTIVITY CHANGES IN A CONDUCTOR

(71) Applicant: International Business Machines Corporation, Armonk, NY (US)

(72) Inventors: Thomas W. Liang, Rochester, MN (US); Matthew Doyle, Chatfield, MN (US); Kyle Schoneck, Rochester, MN (US); John R. Dangler, Rochester, MN (US); Jason J. Bjorgaard, Rochester, MN (US); Kevin Daniel Escobar, Rochester, MN (US); Alexander Jay Wolseth, Rochester, MN (US); Matthew A Walther, Byron, MN (US); Dylan Grace, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 18/616,289

(22) Filed: Mar. 26, 2024

(65) Prior Publication Data

US 2025/0308728 A1 Oct. 2, 2025

(51) Int. Cl.
*H01B 12/16* (2006.01)
*H01B 12/02* (2006.01)

(52) U.S. Cl.
CPC ............. *H01B 12/16* (2013.01); *H01B 12/02* (2013.01)

(58) Field of Classification Search
CPC ................................ H01B 12/16; H01B 12/02
USPC .................................................. 327/527, 528
See application file for complete search history.

(56) References Cited

U.S. PATENT DOCUMENTS

| | | | | | |
|---|---|---|---|---|---|
| 4,348,710 | A * | 9/1982 | Woods | H01F 6/065 327/527 |
| 5,339,062 | A * | 8/1994 | Donaldson | H03K 3/38 327/527 |
| 5,376,626 | A * | 12/1994 | Drehman | H10N 60/35 327/527 |
| 11,768,016 | B2 * | 9/2023 | Monazami | F25B 21/02 62/3.2 |
| 11,784,501 | B2 * | 10/2023 | Green | H02J 7/1423 318/505 |
| 2011/0065585 | A1 * | 3/2011 | Lanting | G01R 33/0017 327/528 |
| 2019/0148848 | A1 * | 5/2019 | Najafi | H03K 19/195 327/527 |

OTHER PUBLICATIONS

Anonymous, "Dynamic Overshoot Protection Circuit Using Bus Hold Circuit," IP.com No. IPCOM000187756D, Sep. 18, 2009, 3 pages.

(Continued)

*Primary Examiner* — Tomi Skibinski
(74) *Attorney, Agent, or Firm* — CANTOR COLBURN LLP; Tihon Poltavets

(57) ABSTRACT

A signal interconnect system for dynamic overshoot and undershoot damping is provided. The signal interconnect system includes a conductor and a temperature control system. The temperature control system is configured to adjust a temperature and thereby a resistivity of the conductor for dynamically damping overshoot and the undershoot of a signal passed along the conductor.

20 Claims, 5 Drawing Sheets

(56) References Cited

OTHER PUBLICATIONS

Anonymous, "Method and Apparatus for using Overshoot Amplitude and Width as a means to communicate," IP.com No. IPCOM000217025D, Apr. 27, 2012, 3 pages.

Anonymous, "System and Method for Dynamic and Accurate High Speed Thermal Control and Regulation," IP.com No. IPCOM000211564D, Oct. 12, 2011, 3 pages.

Anonymous, "Wide frequency range non-overshoot/undershoot ac coupling level shifter," IP.com No. IPCOM000200726D, Oct. 26, 2010, 6 pages.

Araner, "Data Center Cooling Design: Parameters and Influences," URL: https://www.araner.com/blog/data-center-cooling-air-cooled-design-parameters-and-influences, Retrieved: Feb. 15, 2024, 9 pages.

Buemi et al., "Adaptive Sharpening with Overshoot Control," ICIAP 2009, LNCS 5716, pp. 863-872.

Dodd et al., "A Brief Overview of Signal Integrity and Where it Fits in the Digital Design Process," Signal Integrity 101, Jun. 29, 2004, 45 pages.

Lee et al., "Overshoot and Undershoot Control for Transmission Line Interconnects," Electronic Components and Technology Conference, 1999, pp. 879-884.

Lesics, "Microwave Oven—How Does it work?" URL: https://www.youtube.com/watch?v=D9_2qtD8flo, Retrieved: Feb. 15, 2024, 2 pages.

"Bus-Interface Devices With Output-Damping Resistors or Reduced-Drive Outputs", URL: https://www.ti.com/lit/an/scba012a/scba012a.pdf, Retrieved: Mar. 21, 2024, 1997, 18 pages.

Edge Engineers. "Specific heat capacity of metals table chart", retrieved from web https://web.archive.org/web/20231119171139/https://www.engineersedge.com/materials/specific_heat_capacity_of_metals_13259.htm, Nov. 19, 2023, 5 pages.

Li et al. "Conformal High-Power-Density Half-Heusler Thermoelectric Modules: A Pathway toward Practical Power Generators", Energy, Environmental, and Catalysis Applications, Oct. 26, 2021, 27 pages, vol. 13, Issue 45.

Liu et al. "Vertical-cavity surface-emitting lasers for data communication and sensing", Photonics Research, Feb. 2019, 16 pages, DOI: 10.1364/PRJ.7.000121.

Wikipedia. "File:Clock signal.png", retrieved from web https://web.archive.org/web/20221205131737/https://en.wikipedia.org/wiki/File:Clock_signal.png, Dec. 5, 2022, 3 pages.

* cited by examiner

SIGNAL CONTROL USING TEMPERATURE AND RESISTIVITY CHANGES IN A CONDUCTOR

BACKGROUND

The present disclosure generally relates to signal control. More specifically, the present disclosure relates to signal overshoot/undershoot control using temperature changes and/or resistivity changes of a conductor.

In various applications such as signal processing, control theory, electronics and mathematics, overshoot is the occurrence of a signal or function exceeding its target and undershoot a similar phenomenon in the opposite direction. Overshoot and undershoot tend to arise especially in step responses of bandlimited systems. These include, but are not limited to, low-pass filters and other similar devices.

In electronics, overshoot refers to transitory values of any parameter that exceeds its final (steady state) value during its transition from one value to another and undershoot a similar phenomenon in the opposite direction.

SUMMARY

According to an aspect of the disclosure, a signal interconnect system for dynamic overshoot and undershoot damping is provided. The signal interconnect system includes a conductor and a temperature control system. The temperature control system is configured to adjust a temperature and thereby a resistivity of the conductor for dynamically damping overshoot and the undershoot of a signal passed along the conductor. In additional or alternative embodiments, the temperature control system effectively decreases overshoot and undershoot of the signal.

According to an aspect of the disclosure, a signal interconnect system for dynamic overshoot and undershoot damping is provided. The signal interconnect system includes a conductor, a temperature control system configured to adjust a temperature of the conductor and a controller coupled to the conductor and the temperature control system. The controller is configured to sense overshoot and undershoot in a signal passed along the conductor and to control the temperature control system to adjust a resistivity of the conductor by changing a temperature of the conductor for dynamically damping the overshoot and the undershoot of the signal. In additional or alternative embodiments, the temperature control system effectively decreases overshoot and undershoot of the signal.

According to an aspect of the disclosure, a method of dynamic overshoot and undershoot damping for a signal interconnect system is provided. The method includes passing a signal along a conductor, sensing overshoot and undershoot in the signal and adjusting a resistivity of the conductor by changing a temperature of the conductor for dynamically damping the overshoot and the undershoot of the signal. In additional or alternative embodiments, the method effectively decreases overshoot and undershoot of the signal.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

Figure 1A:
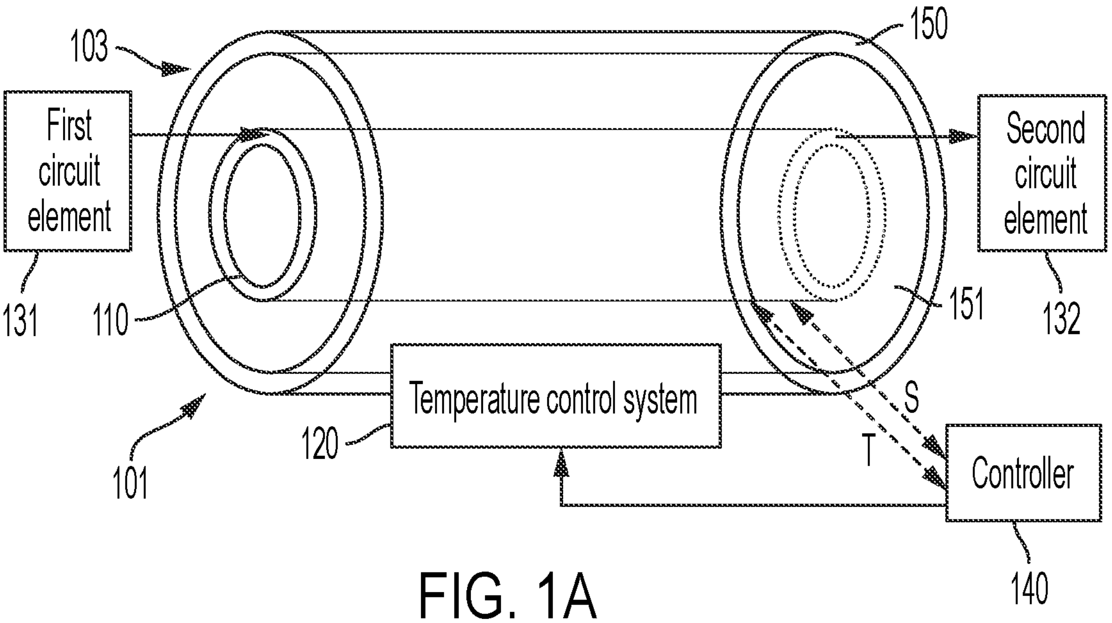
FIG. 1A is a side schematic view of a signal interconnect system in accordance with one or more embodiments.

The diagrams depicted herein are illustrative. There can be many variations to the diagram or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

According to an aspect of the disclosure, a signal interconnect system for dynamic overshoot and undershoot damping is provided. The signal interconnect system includes a conductor and a temperature control system. The temperature control system is configured to adjust a temperature and thereby a resistivity of the conductor for dynamically damping overshoot and the undershoot of a signal passed along the conductor. In additional or alternative embodiments, the temperature control system effectively decreases overshoot and undershoot of the signal.

The signal interconnect system further includes a ground braid proximate to the conductor and the temperature control system is configured to pass current through at least a section of the ground braid to generate heat to heat the conductor. As such, the signal interconnect system to be used with a coaxial cable.

The conductor is a center conductor and the ground braid coaxially surrounds the center conductor and the signal interconnect system further includes first insulation radially interposed between the center conductor and the ground braid. As such, the signal interconnect system to be used with a coaxial cable.

The conductor surrounds a central passage and the temperature control system includes a magnetron configured send an incident wave or signal along at least a section of the central passage and a reflector configured to reflect the incident wave or signal backwards as a reflected wave or signal that forms with the incident wave or signal a standing wave with hot spots to heat the conductor. The standing wave hot spots are distributed along a length of the conductor where the incident and reflected waves are coincident with one another.

The conductor includes superconducting materials and the temperature control system is configured to adjust a resistivity of the superconducting materials of the conductor by changing the temperature of the conductor. This makes use of the property of superconducting materials that their resistivity changes abruptly under certain temperature conditions.

The conductor includes superconducting materials and the temperature control system is configured to adjust a resistivity of the superconducting materials of the conductor by running current through the conductor to change the temperature of the center conductor. This makes use of the property of superconducting materials that their resistivity changes abruptly under certain current conditions.

The conductor surrounds a central passage and the temperature control system includes a Peltier device disposed within the central passage and configured to change the center conductor temperature. The Peltier device provides for efficient heat transfer.

According to an aspect of the disclosure, a signal interconnect system for dynamic overshoot and undershoot damping is provided. The signal interconnect system includes a conductor, a temperature control system configured to adjust a temperature of the conductor and a controller coupled to the conductor and the temperature control system. The controller is configured to sense overshoot and undershoot in a signal passed along the conductor and to control the temperature control system to adjust a resistivity of the conductor by changing a temperature of the conductor for dynamically damping the overshoot and the undershoot of the signal. In additional or alternative embodiments, the temperature control system effectively decreases overshoot and undershoot of the signal.

The signal interconnect system further includes a ground braid proximate to the conductor and the temperature control system is controllable by the controller to pass current through at least a section of the ground braid to generate heat to heat the conductor. As such, the signal interconnect system to be used with a coaxial cable.

The conductor is a center conductor and the ground braid coaxially surrounds the center conductor and the signal interconnect system further includes first insulation radially interposed between the center conductor and the ground braid. As such, the signal interconnect system to be used with a coaxial cable.

The conductor surrounds a central passage and the temperature control system includes a magnetron controllable by the controller to send an incident wave or signal along at least a section of the central passage and a reflector configured to reflect the incident wave or signal backwards as a reflected wave or signal that forms with the incident wave or signal a standing wave with hot spots to heat the conductor. The standing wave hot spots are distributed along a length of the conductor where the incident and reflected waves are coincident with one another.

The conductor includes superconducting materials and the temperature control system is controllable by the controller to adjust a resistivity of the superconducting materials of the conductor by changing the temperature of the conductor. This makes use of the property of superconducting materials that their resistivity changes abruptly under certain temperature conditions.

The conductor includes superconducting materials and the temperature control system is controllable by the controller to adjust a resistivity of the superconducting materials of the conductor by running current through the conductor to change the temperature of the conductor. This makes use of the property of superconducting materials that their resistivity changes abruptly under certain current conditions.

The conductor surrounds a central passage and the temperature control system includes a Peltier device disposed within the central passage and configured to change the temperature of the conductor. The Peltier device provides for efficient heat transfer.

According to an aspect of the disclosure, a method of dynamic overshoot and undershoot damping for a signal interconnect system is provided. The method includes passing a signal along a conductor, sensing overshoot and undershoot in the signal and adjusting a resistivity of the conductor by changing a temperature of the conductor for dynamically damping the overshoot and the undershoot of the signal. In additional or alternative embodiments, the method effectively decreases overshoot and undershoot of the signal.

The adjusting of the resistivity of the conductor includes heating a ground braid disposed proximate to the conductor. As such, the signal interconnect system to be used with a coaxial cable.

The adjusting of the resistivity of the conductor includes generating a standing wave with hot spots to heat the conductor. The standing wave hot spots are distributed along a length of the conductor where the incident and reflected waves are coincident with one another.

The conductor includes superconducting materials and the adjusting of the resistivity of the conductor includes adjusting a resistivity of the superconducting materials of the conductor by changing the temperature of the conductor. This makes use of the property of superconducting materials that their resistivity changes abruptly under certain temperature conditions.

The conductor comprises superconducting materials and the adjusting of the resistivity of the conductor includes adjusting a resistivity of the superconducting materials of the conductor by running current through the conductor to change the temperature of the conductor. This makes use of the property of superconducting materials that their resistivity changes abruptly under certain current conditions.

The conductor surrounds a central passage and the adjusting of the resistivity of the conductor includes operating a Peltier device disposed within the central passage to change the temperature of the conductor. The Peltier device provides for efficient heat transfer.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the disclosure, overshoot and undershoot phenomena are key metrics of signal integrity in a circuit. If the circuit is not tuned properly, or overshoot and/or undershoot are not appropriately taken into consideration, a performance of the circuit in terms of data rate, error counts and stability can be all negatively impacted. For example, in some cases, overshoot and/or undershoot can cause a ringback effect that can lead to bit errors.

In greater detail, overshoot occurs when a signal exceeds its final value in a transition period. This can be an issue particularly in higher order modulation schemes, such as 4-level phase amplitude modulation (PAM4) schemes (i.e., overshooting on level 2 could cause a decision on level 3 that leads to a bit error). Overshoot tends to occur when a system is underdamped on higher frequency components. Increased conductor losses affect higher frequencies more, thus damping high frequency components that contribute to overshoot.

Turning now to an overview of the aspects of the disclosure, one or more embodiments of the disclosure address the above-described shortcomings of the prior art by providing ways of addressing waveform overshoot/undershoot through use of conductor temperature and resistivity control. By changing a temperature of a cable, a conductance of conductors in the cable can be changed (i.e., higher temperature→higher resistance→higher conductor loss). Intelligently choosing conductors can increase the effect of temperature changes.

Changing temperatures in a cable can change a resistance value of a signal channel of the cable. Intentionally manipulating the resistance of the signal channel can affect slew rate, signal attenuation and overshoot. The following description will relate to increases or decreases of temperatures within cabled interconnects to improve signal integrity by reducing overshoot and/or undershoot phenomena. Various ways to achieve this effect include, but are not limited to, running current through a ground braid, heating a center conductor by applying additional energy outside a band of interest at higher frequencies, the use of superconductors within a cable construct and using temperature or current changes to control resistivities and the use of a Peltier device formed as a cylinder within a hollow-conductive interconnect that can be liquid-cooled when used to decrease a temperature of adjacent signal material and that does not need cooling when used to heat the adjacent signal material.

The above-described aspects of the disclosure address the shortcomings of the prior art by providing a signal interconnect system for dynamic overshoot and undershoot damping. The signal interconnect system includes a conductor and a temperature control system configured to adjust a temperature and thereby a resistivity of the conductor for dynamically damping overshoot and the undershoot of a signal passed along the conductor.

Figure 1B:
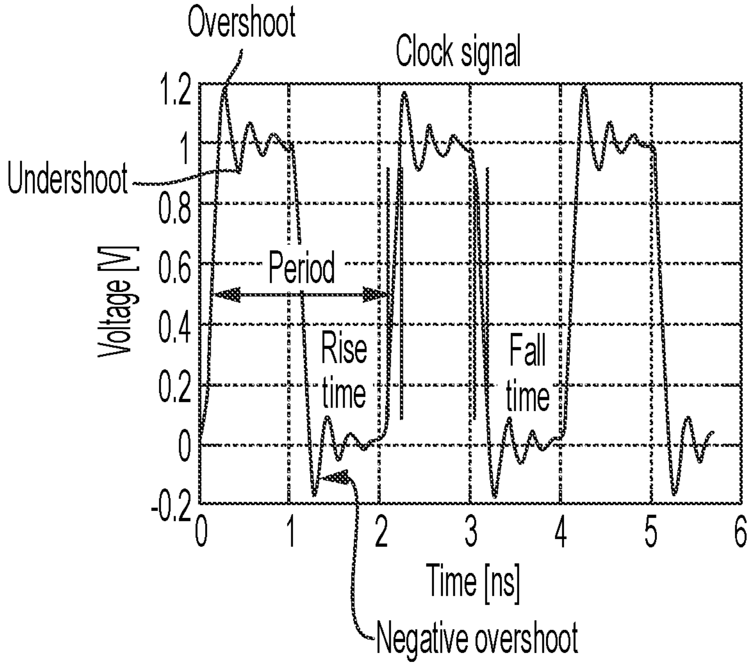
FIG. 1B is a graphical illustration of overshoot and undershoot in a signal in accordance with one or more embodiments.

Turning now to a more detailed description of aspects of the present disclosure, FIG. 1A depicts a signal interconnect system 101 for dynamic overshoot and undershoot damping of a signal and FIG. 1B is a graphical illustration of the signal. The signal interconnect system 101 includes a conductor 110 and a temperature control system 120. The temperature control system 120 is configured to adjust a temperature and thereby a resistivity of the conductor 110 for dynamically damping overshoot and the undershoot of a signal passed along the conductor 110.

For purposes of description, the signal interconnect system 101 can further include, but is not required to include, first and second circuit elements 131, 132 disposed in signal communication with one another via the conductor 110 and a controller 140. The controller 140 can be coupled to the conductor 110 and to the temperature control system 120. The controller 140 is configured to sense overshoot and undershoot in a signal passed between the first and second circuit elements 131, 132 along the conductor 110 (i.e., by way of a signal sensor or oscilloscope). The controller 140 can also be configured to sense a temperature of the conductor 110 (i.e., by way of one or more temperature sensors connected to the conductor 110). The controller 140 is further configured to control the temperature control system 120 to adjust a resistivity of the conductor 110 by changing the temperature of the conductor 110 for dynamically damping the overshoot and the undershoot of the signal in accordance with at least overshoot and undershoot sensing results.

That is, in an event the controller 140 determines that the signal passed along the conductor 110 exhibits overshoot (see FIG. 1B), the controller 140 can control the temperature control system 120 to heat at least a section of the conductor 110. This will increase the temperature of the section of the conductor 110 and thereby effectively increase the temperature of the conductor 110 as a whole. The increased temperature will in turn lead to an increased resistance of the conductor 110 which will act as a damper for the signal to cancel or at least mitigate the overshoot of the signal. Conversely, in an event the controller 140 determines that the signal passed along the conductor 110 exhibits undershoot (see FIG. 1B), the controller 140 can control the temperature control system 120 to cool at least a section of the conductor 110. This will decrease the temperature of the section of the conductor 110 and thereby effectively decrease the temperature of the conductor 110 as a whole. The decreased temperature will in turn lead to a decreased resistance of the conductor 110 which will act as a damper for the signal to cancel or at least mitigate the undershoot of the signal.

In an exemplary case, copper has a resistivity temperature dependence of approximately 0.451%/Kelvin. In order to create a 10% change in the resistivity (and therefore a 10% change in resistance), copper requires approximately a 22 Kelvin temperature change. In addition, 0.75 A on a 5 mil wide trace could provide a 20° C. ΔT. Thus, it is possible that a 10% change in resistance on a 2 in, 2 oz, 5 mil trace is achievable in ~5-10 ms depending on materials.

In accordance with embodiments and as shown in FIG. 1A, the conductor 110 of the signal interconnect system 101 can be provided as a center conductor 102 of a coaxial cable 103. In these or other cases, the signal interconnect system 101 can further include a ground braid 150 that is proximate to or disposed to coaxially surround the conductor (hereinafter referred to as the "center conductor") 110, first insulation 151 that is radially interposed between the center conductor 110 and the ground braid 150 and, in some cases, second insulation (not shown) disposable to coaxially surround the ground braid 150. The following description will relate generally to this embodiment. This is done for clarity and brevity and it not intended to otherwise limit the description or the following claims.

In accordance with one or more embodiments, the temperature control system 120 is configured to be controllable by the controller 140 to pass current through at least a section of the ground braid 150. The current passing through the ground braid 150 will heat the ground braid 150 and, since the ground braid 150 is proximate to the center conductor 110 or disposed to coaxially surround the center conductor 110, the heat of the ground braid 150 will be transmitted to a corresponding section of the center conductor 110. This will effectively heat the center conductor 110 as a whole and will thereby increase a resistance of the center conductor 110 to damp signal overshoot.

It is to be understood that, in cases in which only a section of the ground braid 150 and only the corresponding section of the center conductor 110 are heated, overshoot damping provided by the effects of the increased resistivity at the corresponding section of the center conductor 110 will be effective along an entirety of the center conductor 110 at least downstream from the corresponding section of the center conductor 110.

Figure 2:
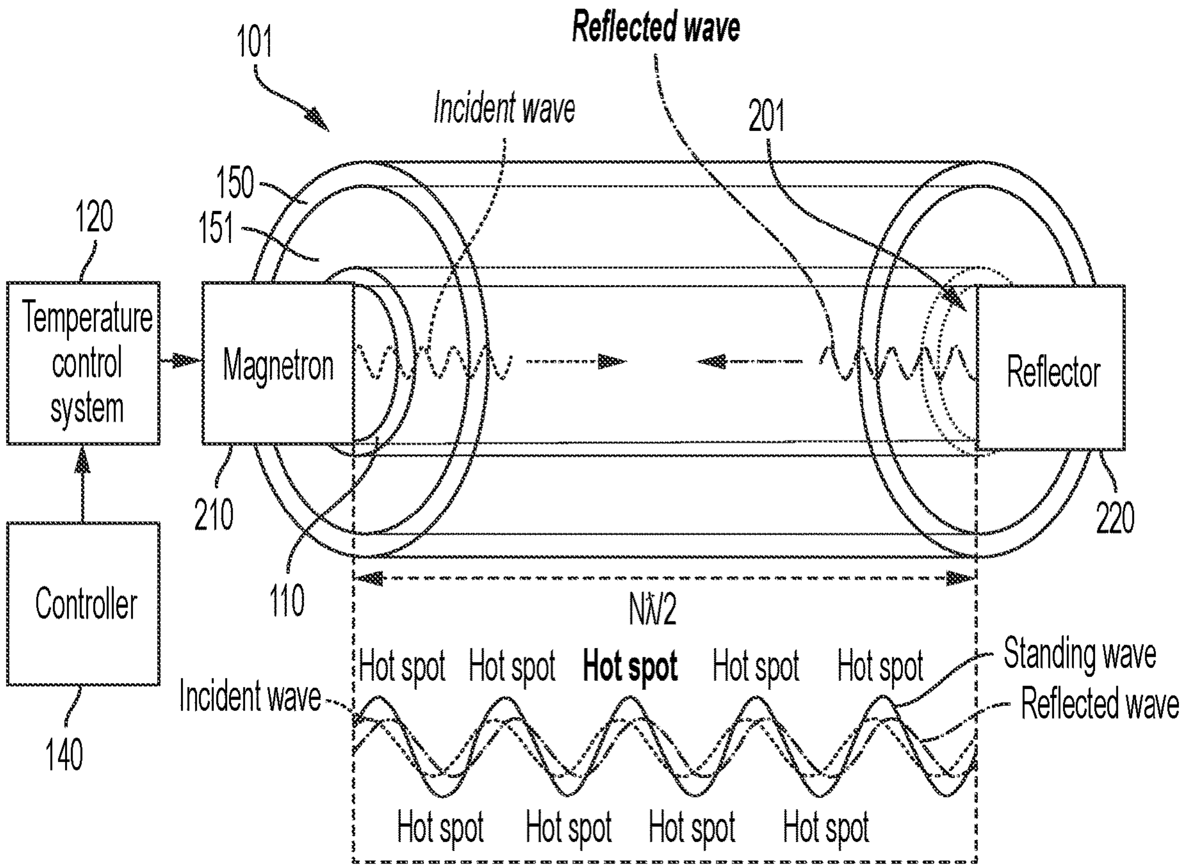
FIG. 2 is a side schematic view of a signal interconnect system including a magnetron and a reflector in accordance with one or more embodiments

With reference to FIG. 2, the center conductor 110 can be formed to surround a central passage 201. In these or other cases, the temperature control system 120 can include a magnetron 210 and a reflector 220. The magnetron 210 is configured to be controllable by the controller 140 to send an incident wave or signal along at least a section of the central passage 201 and the reflector 220 is disposed and configured to reflect the incident wave or signal backwards as a reflected wave or signal. This reflected wave or signal forms, with the incident signal, a standing wave with hot spots to heat the center conductor 110.

Figure 3A:
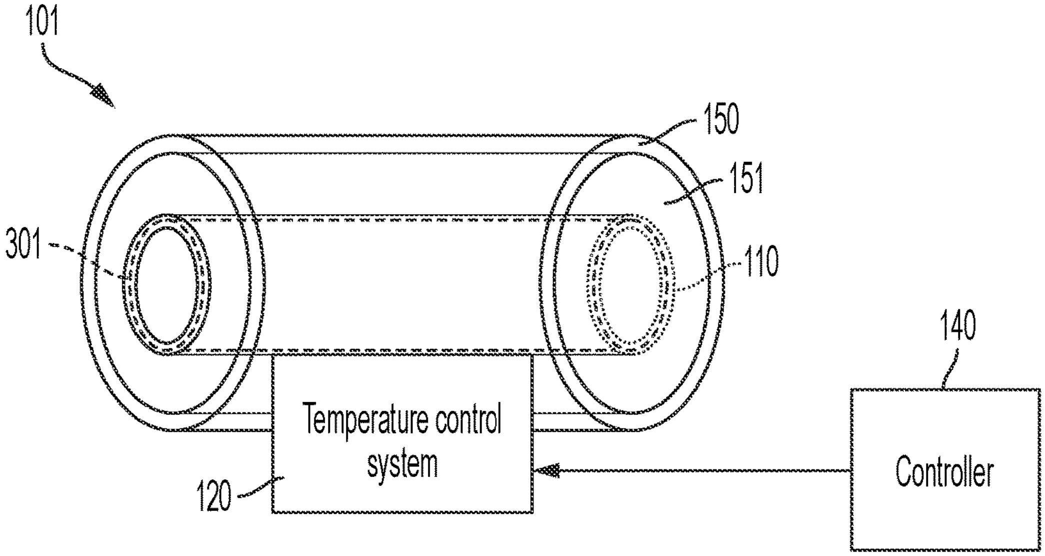
FIG. 3A is a side schematic view of a signal interconnect system with a conductor including superconducting materials in accordance with one or more embodiments.
Figure 3B:
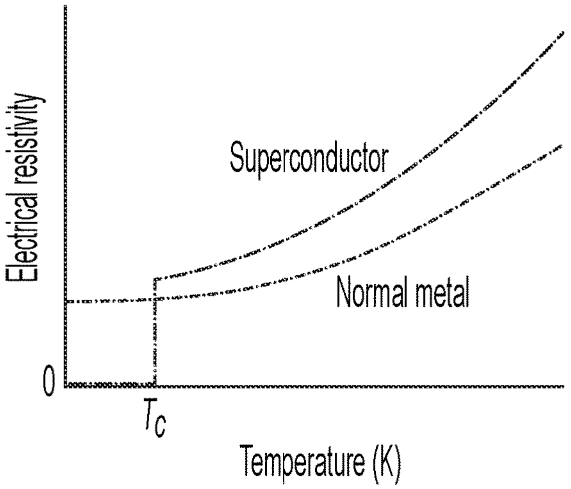
FIG. 3B is a graphical illustration of a relationship between electrical resistivity and temperature of superconducting materials in accordance with one or more embodiments.
Figure 3C:
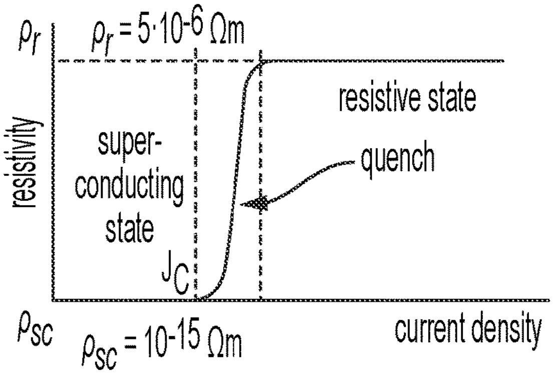
FIG. 3C is a graphical illustration of a relationship between electrical resistivity and current density of superconducting materials in accordance with one or more embodiments.

With reference to FIGS. 3A, 3B and 3C, the center conductor 110 can include superconducting materials 301. In these or other cases, the temperature control system 120 is configured by the controller 140 to adjust a resistivity of the superconducting materials 301 by changing the temperature of the center conductor 110 using any suitable heating/cooling systems or methods (including ones similar to those described herein) or by running current through the center conductor 110 using any suitable systems or methods (including ones similar to those described herein) to change the temperature of the center conductor 110. The effectiveness of these or other embodiments illustrated in FIGS. 3B and 3C. FIG. 3B shows the relationship between electrical resistivity and temperature of a superconducting material as compared to normal metal as well as the sharp phase transition of superconducting material at the critical temperature $T_C$. FIG. 3C shows the relationship between electrical resistivity and current density of a superconducting material and makes clear that, alongside having a sharp phase transition at the critical temperature $T_C$, superconductor material also has a sharp phase transition due to a critical current density $J_C$ whereby drive current density above or below the critical current density $J_C$ causes a sharp change in material resistivity which can be used to dampen a signal.

Figure 4:
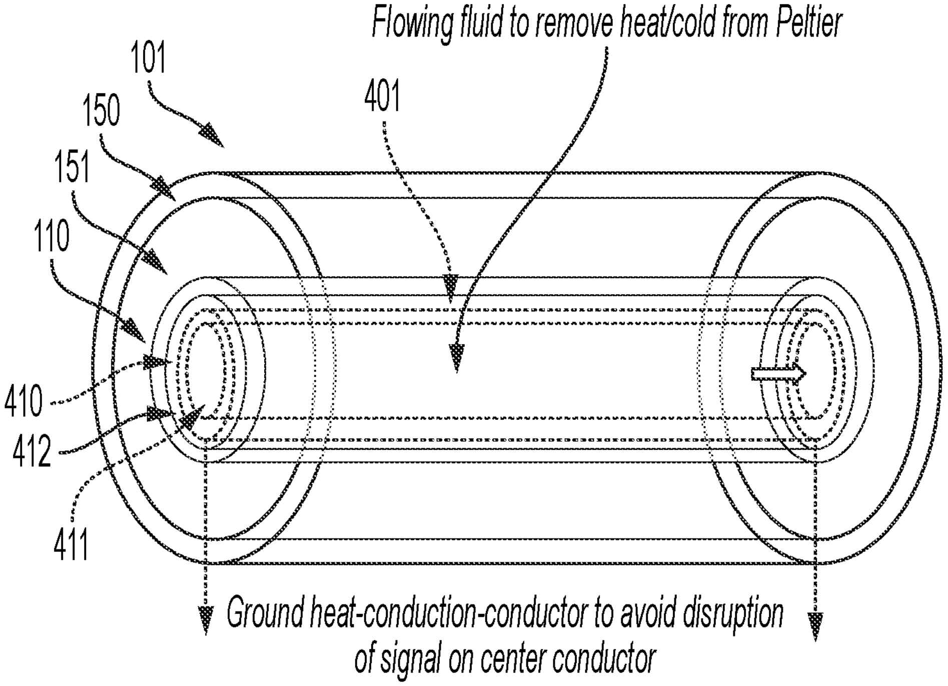
FIG. 4 is a side schematic view of a signal interconnect system including a Peltier device in accordance with one or more embodiments.

With reference to FIG. 4, the center conductor 110 can be formed to surround a central passage 401. In these or other cases, the temperature control system 120 can include a Peltier device 410 disposed within the central passage 401 and configured to change the temperature of the center conductor 110 by heating or cooling. As shown in FIG. 4, the Peltier device 410 can be provided as a hollow cylinder through which fluid can be flown or not flown for heating or cooling purposes. In any case, the Peltier device 410 can include a conductor 411 to conduct heat radially and a surrounding insulator 412 that provides some thermal and/or structural protection.

Figure 5:
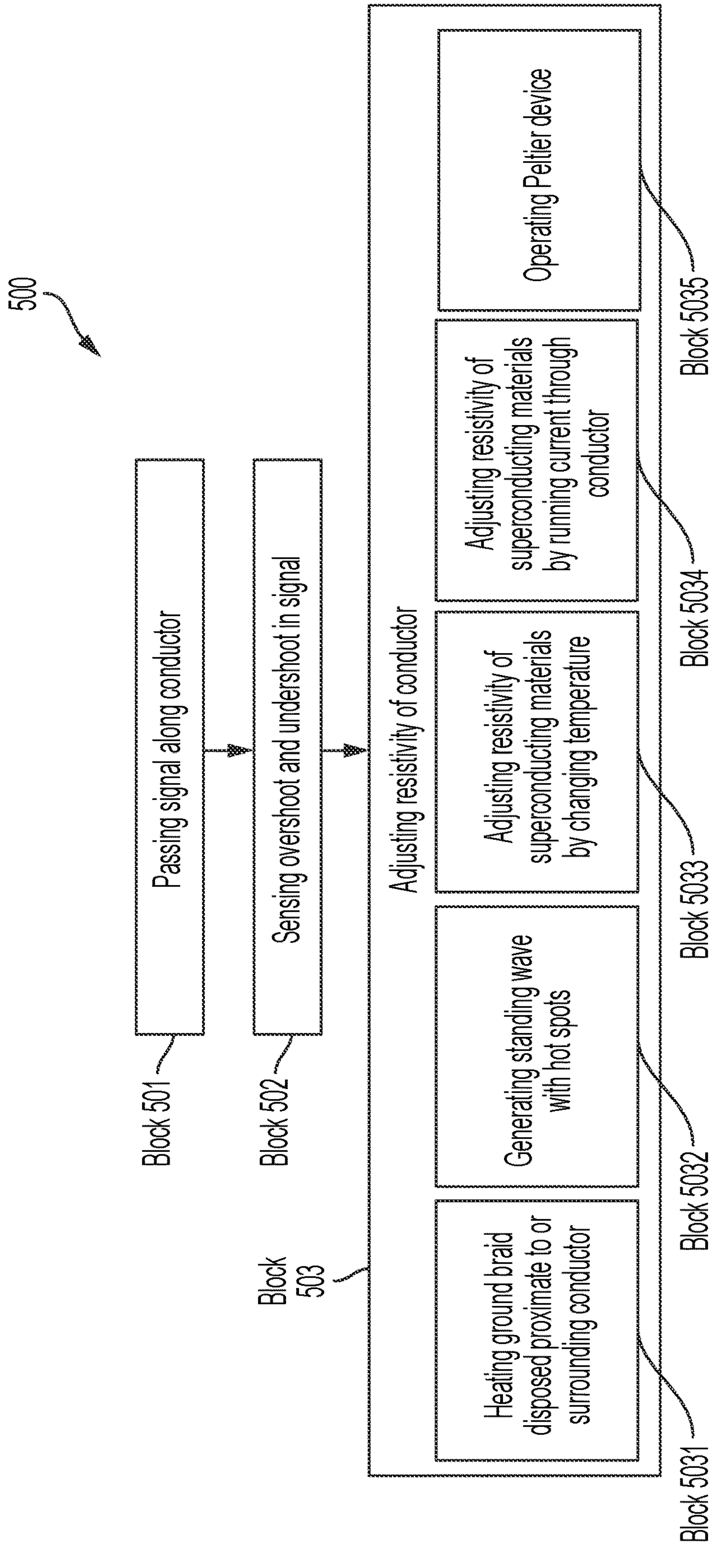
FIG. 5 is a flow diagram illustrating a method of dynamic overshoot and undershoot damping for a signal interconnect system in accordance with one or more embodiments.

With reference to FIG. 5, a method 500 of dynamic overshoot and undershoot damping for a signal interconnect system, such as the signal interconnect system 101 described herein, is provided. The method 500 includes passing a signal along a conductor (block 501), optionally sensing overshoot and undershoot in the signal (block 502) and adjusting a resistivity of the conductor (block 503) by changing the temperature of the conductor for dynamically damping the overshoot and the undershoot. As described above, the adjusting of the resistivity of the conductor of block 503 can include one or more of heating a ground braid disposed proximate to or coaxially surrounding the conductor (block 5031), generating a standing wave with hot spots to heat the conductor (block 5032), adjusting a resistivity of superconducting materials of the conductor by changing the temperature of the conductor (block 5033), adjusting a resistivity of superconducting materials of the conductor by running current through the conductor to change the temperature of the conductor (block 5034) and operating a Peltier device disposed within the central passage to change the temperature of the conductor (block 5035).

Various embodiments of the present disclosure are described herein with reference to the related drawings. Alternative embodiments can be devised without departing from the scope of this disclosure. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the disclosure, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present disclosure will now be provided. Although specific fabrication operations used in implementing one or more embodiments of the present disclosure can be individually known, the described combination of operations and/or resulting structures of the present disclosure are unique. Thus, the unique combination of the operations described in connection with the fabrication of a semiconductor device according to the present disclosure utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present disclosure. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present disclosure have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A signal interconnect system for dynamic overshoot and undershoot damping, comprising:

a conductor; and a temperature control system configured to adjust a temperature and thereby a resistivity of the conductor for dynamically damping overshoot and the undershoot of a signal passed along the conductor.

2. The signal interconnect system according to claim 1, wherein:

the signal interconnect system further comprises a ground braid proximate to the conductor, and the temperature control system is configured to pass current through at least a section of the ground braid to generate heat to heat the conductor.

3. The signal interconnect system according to claim 2, wherein:

the conductor is a center conductor and the ground braid coaxially surrounds the center conductor, and the signal interconnect system further comprises first insulation radially interposed between the center conductor and the ground braid.

4. The signal interconnect system according to claim 1, wherein the conductor surrounds a central passage and the temperature control system comprises:

a magnetron configured send an incident wave or signal along at least a section of the central passage; and a reflector configured to reflect the incident wave or signal backwards as a reflected wave or signal that forms with the incident wave or signal a standing wave with hot spots to heat the conductor.

5. The signal interconnect system according to claim 1, wherein:

the conductor comprises superconducting materials, and the temperature control system is configured to adjust a resistivity of the superconducting materials of the conductor by changing the temperature of the conductor.

6. The signal interconnect system according to claim 1, wherein:

the conductor comprises superconducting materials, and the temperature control system is configured to adjust a resistivity of the superconducting materials of the conductor by running current through the conductor to change the temperature of the center conductor.

7. The signal interconnect system according to claim 1, wherein:

the conductor surrounds a central passage, and the temperature control system comprises a Peltier device disposed within the central passage and configured to change the center conductor temperature.

8. A signal interconnect system for dynamic overshoot and undershoot damping, comprising:

a conductor;

a temperature control system configured to adjust a temperature of the conductor; and a controller coupled to the conductor and the temperature control system, the controller being configured to sense overshoot and undershoot in a signal passed along the conductor and to control the temperature control system to adjust a resistivity of the conductor by changing a temperature of the conductor for dynamically damping the overshoot and the undershoot of the signal.

9. The signal interconnect system according to claim 8, wherein:

the signal interconnect system further comprises a ground braid proximate to the conductor, and the temperature control system is controllable by the controller to pass current through at least a section of the ground braid to generate heat to heat the conductor.

10. The signal interconnect system according to claim 9, wherein:

the conductor is a center conductor and the ground braid coaxially surrounds the center conductor, and the signal interconnect system further comprises first insulation radially interposed between the center conductor and the ground braid.

11. The signal interconnect system according to claim 8, wherein the conductor surrounds a central passage and the temperature control system comprises:

a magnetron controllable by the controller to send an incident wave or signal along at least a section of the central passage; and a reflector configured to reflect the incident wave or signal backwards as a reflected wave or signal that forms with the incident wave or signal a standing wave with hot spots to heat the conductor.

12. The signal interconnect system according to claim 8, wherein:

the conductor comprises superconducting materials, and the temperature control system is controllable by the controller to adjust a resistivity of the superconducting materials of the conductor by changing the temperature of the conductor.

13. The signal interconnect system according to claim 8, wherein:

the conductor comprises superconducting materials, and the temperature control system is controllable by the controller to adjust a resistivity of the superconducting materials of the conductor by running current through the conductor to change the temperature of the conductor.

14. The signal interconnect system according to claim 8, wherein:

the conductor surrounds a central passage, and the temperature control system comprises a Peltier device disposed within the central passage and configured to change the temperature of the conductor.

15. A method of dynamic overshoot and undershoot damping for a signal interconnect system, the method comprising:

passing a signal along a conductor;

sensing overshoot and undershoot in the signal; and adjusting a resistivity of the conductor by changing a temperature of the conductor for dynamically damping the overshoot and the undershoot of the signal.

16. The method according to claim 15, wherein the adjusting of the resistivity of the conductor comprises heating a ground braid disposed proximate to the conductor.

17. The method according to claim 15, wherein the adjusting of the resistivity of the conductor comprises generating a standing wave with hot spots to heat the conductor.

18. The method according to claim 15, wherein the conductor comprises superconducting materials and the adjusting of the resistivity of the conductor comprises adjusting a resistivity of the superconducting materials of the conductor by changing the temperature of the conductor.

19. The method according to claim 15, wherein the conductor comprises superconducting materials and the adjusting of the resistivity of the conductor comprises adjusting a resistivity of the superconducting materials of the conductor by running current through the conductor to change the temperature of the conductor.

20. The method according to claim 15, wherein the conductor surrounds a central passage and the adjusting of the resistivity of the conductor comprises operating a Peltier device disposed within the central passage to change the temperature of the conductor.

* * * * *